(12) United States Patent
Cho et al.

(10) Patent No.: US 7,104,377 B2
(45) Date of Patent: Sep. 12, 2006

(54) CLUTCH FOR TRANSMISSION OF POWER

(75) Inventors: Dae Hyun Cho, Kyungnam (KR);
Hong Sik Park, Kyungnam (KR);
Hyun Kyu Shin, Kyungnam (KR);
Dong Won Lim, Kyungnam (KR);
Kwang Soo Kim, Kyungnam (KR)

(73) Assignee: DACC Co., Ltd., Kyungnam (KR)

( * ) Notice: Subject to any disclaimer, the term of this patent is extended or adjusted under 35 U.S.C. 154(b) by 37 days.

(21) Appl. No.: 10/825,070

(22) Filed: Apr. 15, 2004

(65) Prior Publication Data

US 2005/0109575 A1    May 26, 2005

(30) Foreign Application Priority Data

Nov. 26, 2003    (KR)    ............... 10-2003-0084605

(51) Int. Cl.
*F16D 69/02*    (2006.01)
(52) U.S. Cl. .............................. 192/70.14; 192/107 M
(58) Field of Classification Search ............ 192/70.14, 192/70.16, 107 R, 107 M
See application file for complete search history.

(56) References Cited

U.S. PATENT DOCUMENTS

| | | | | |
|---|---|---|---|---|
| 1,979,880 A | * | 11/1934 | Heinrich | 192/105 C |
| 3,759,353 A | * | 9/1973 | Marin | 188/71.5 |
| 4,846,326 A | | 7/1989 | Tilton et al. | 192/70.19 |
| 5,007,508 A | * | 4/1991 | Lacombe | 188/251 A |
| 5,098,758 A | * | 3/1992 | Kani | 428/37 |
| 5,395,864 A | * | 3/1995 | Miyoshi et al. | 523/155 |
| 5,975,271 A | | 11/1999 | Iwata | 192/200 |
| 6,042,935 A | * | 3/2000 | Krenkel et al. | 428/307.7 |
| 6,183,583 B1 | | 2/2001 | Duval et al. | 156/148 |
| 6,514,592 B1 | * | 2/2003 | Hubbard et al. | 428/66.2 |
| 2002/0014386 A1 | * | 2/2002 | Diemer et al. | 192/70.14 |
| 2002/0179395 A1 | | 12/2002 | Uchara | 192/70.17 |

* cited by examiner

*Primary Examiner*—Richard M. Lorence
(74) *Attorney, Agent, or Firm*—Fish & Richardson P.C.

(57) ABSTRACT

The present invention relates to a clutch for transmission power. The clutch for transmission power according to the present invention includes flywheel, clutch cover and clutch disk assembly positioning between the flywheel and the clutch cover; moreover, the clutch disk assembly includes a clutch facing having main body portion formed with a center hole in the middle thereof, and a contacting portion wherein one side thereof faces the friction pad at said flywheel side and the other side thereof faces the press plate of said clutch cover, and the portion facing each other between the friction pad and the press plate is made of carbon-carbon composition; a spline hub being overlapped with one side of the clutch facing wherein a spline groove is formed in the inner diameter thereof and a connecting means for connecting the clutch facing with the spline hub. Furthermore, the clutch disk assembly and the method of manufacturing the friction substance for clutch according to the invention can improve assemblability and reduce weight by simplifying it as a single part without using shock absorbing apparatus such as coil spring or the like on clutch disk assembly. In addition, the power transmission of an engine can be improved, and also it has an effect that an automobile can start softly and slippage does not occur even at abrupt acceleration by providing with carbon-carbon composition or carbon-silicon carbide composition having excellent shock absorption function.

11 Claims, 7 Drawing Sheets

CLUTCH FOR TRANSMISSION OF POWER

FIELD OF INVENTION

The present invention relates to a clutch for transmission of power and a method of manufacturing a friction substance for the clutch, more particularly, to a clutch for transmission power and a method of manufacturing friction substance for the clutch wherein transmission power is excellent and soft start is attainable by simplifying the structure of spline hub as a single part, as well as by applying carbon-carbon composition having high performance in durability, shock absorption and friction.

BACKGROUND OF THE INVENTION

In general, a clutch characteristically requires response characteristics, such as soft gearshift and fast and high transmission power, as a mechanical element for transmitting power wherein a driving shaft and a driven shaft are connected to each other in mechanical devices. This clutch can be used for various industrial areas such as automobiles, motorcycles, industrial machines, presses, ships, etc.

In particular, the clutch used for automobile is designed to allow slippage movement by half clutch operation to attain soft start for vehicles. Accordingly, high-temperature frictional heat can be created within the range of 200° C.~600° C. with this half clutch operation.

As a result, the clutch undergoes phenomena such as thermal load and fatigue, dynamic load by intermittent contact torque of the clutch caused by friction, and deterioration of clutch cover and disk at high temperature due to friction over the areas such as flywheel, clutch disk, press plate, etc. since high torque power is transmitted by friction.

Caused by this phenomena, fatigue, crack or the like are created by thermal load and dynamic load, and also fading is created due to the reduced friction coefficient at high temperature as well as at high RPM (revolutions per minute). This is the main cause for reducing the life of a clutch.

Various studies for solving the above-mentioned problem have been progressed until now. As for known solutions for these problems, there are a clutch cushion plate, a rubber damper, wave spring, etc. which are used for the shock absorption structure, and also a method of providing ventilation grooves at clutch disk or providing holes at flywheel or press plate was developed as cooling system.

SUMMARY OF THE INVENTION

It is an object of the invention to provide a clutch for transmission power for minimizing the damage on its life span which is induced by the friction at high temperature by providing the material of clutch facing with carbon-carbon composition having a simple structure without using a cushion plate, a rubber damper, wave spring or cooling system.

It is another object of the invention to provide a method of manufacturing a friction substance for the clutch wherein the friction substance that is used for the clutch such as a clutch facing, press pad and friction pad can be produced with carbon-carbon composition.

A clutch for transmission power to achieve the first object of the invention includes a flywheel, a clutch cover and a clutch disk assembly positioned between the flywheel and the clutch cover, wherein the clutch disk assembly includes a clutch facing having the body portion formed with a center hole in the middle thereof, and a contacting portion wherein one side thereof faces the friction pad at the flywheel side and the other side thereof faces the press plate of the clutch cover, and the portion facing each other between the friction pad and the press plate is made of carbon-carbon composition; a spline hub being overlapped with one side of the clutch facing wherein a spline groove is formed in the inner diameter thereof; and a combining means for combining the clutch facing with the spline hub.

Moreover, the spline hub is formed with a boss for inserting into the center hole of the clutch facing, and the combining means includes a retainer ring being overlapped with the other side of the clutch facing; and a fastening member by passing through the clutch facing, the spline hub and the retainer ring. Here, the fastening member includes either bolt or rivet selectively.

On the other hand, the contacting portion is formed with carbon-carbon composition which is composed of 20~75 weight % of carbon fiber and 25~80 weight % of pitch.

Another aspect of the invention is that the contacting portion is made of carbon-silicon carbide which is composed of 3~20 weight % of silicon, 10~60 weight % of silicon carbide, and 20~87 weight % of pitch-containing carbon.

Furthermore, the carbon fiber is a single fiber, or it is formed by continuously woven carbon fabrics.

In another aspect of the invention, moreover, the body portion is integrally formed with the contacting portion by using the same carbon-carbon composition material which is used for the contacting portion.

Still another aspect of the invention is that the press plate is provided with the press pad adjoining the clutch facing, and the press pad and the friction pad are formed with the same carbon-carbon composition which is used for the contacting portion.

The method of manufacturing the friction substance for the clutch to achieve the second object of the invention can be divided into two steps. The first step is to produce a two-dimensional preform, and the second step is to produce a three-dimensional preform.

The method of producing a two-dimensional preform includes the steps of performing a first thermal treatment wherein carbon fiber is thermally treated for graphitization at a first thermal processing temperature, producing a prepreg wherein resin is sprayed on carbon fiber fabrics to form the prepreg, producing a preform wherein carbon fiber and resin are stacked on the prepreg to form the preform, producing a mold wherein the mold is formed by using a press on the preform, and performing a second thermal treatment wherein the mold is thermally treated at a second thermal processing temperature.

Another aspect of the invention further includes the step of cutting the thermally treated carbon fiber at the length of 200~2,000 μm by using fiber-cutting machine between the first thermal treatment process and the prepreg producing process.

Still another aspect of the invention includes a densification process for densifying the mold at a predetermined density using a carbonization/impregnation process for pressurizing at the carbonizing pressure of 50~2,000 kg/cm² within the range of 750~1,400° C. for 3~5 hours between the mold producing process and the second thermal treatment process. Here, the predetermined density is 1.3~1.6 g/cm³.

In still further aspect of the invention, the first thermal processing temperature is 2,000~3,000° C. during the first thermal treatment process.

In the step of producing a mold, moreover, the mold is composed of 20~75 weight % of carbon fiber and 25~80 weight % of the resin, and molded by heating within the range of 200~300° C. at the press.

In another aspect of the invention, the second thermal treatment process is performed at the maximum temperature for 3~5 hours under second thermal processing temperature of 1,700~2,500° C., vacuum level of 3~5 mmHg, and heat rising rate of 20~100° C./hr.

In still another aspect of the invention, it further includes the steps of performing a silicon powder addition process by adding silicon powder to the mold after the second thermal treatment process, and performing a vacuum heating process for increasing the temperature within the range of 1,450° C.~2,200° C. and maintaining it for 0.1~5.0 hours under the vacuum atmosphere, and silicon powder 0.2~5.0 times heavier than the mold in weight ratio is added during the silicon powder addition process. After finishing the vacuum heating process, the mold is composed of 3~25 weight % of silicon, 10~65 weight % of silicon carbide, and 10~80 weight % of carbon.

The method of producing a three-dimensional preform includes the steps of heating for creating a thermal gradient between the inside and outside of the preform by mounting a heating element on the three-dimensional preform, infiltrating reaction gas containing 1~6 carbons per molecule inside the reactor, producing a mold by performing reaction under a predetermined condition, and performing a thermal treatment on the mold.

Furthermore, the predetermined condition is heat rising rate of 10~20° C./min, reaction temperature of 700~1200° C., reaction gas concentration of 10~100%, and reaction pressure of 250~1,500 mbar, and the thermal treatment process is performed at the maximum temperature for 3~5 hours under second thermal processing temperature of 1,700~2,500° C., vacuum level of 3~5 mmHg, and heat rising rate of 20~100° C./hr.

Moreover, the friction substance produced by the above-mentioned two methods can be used for any one or all of the clutch facing, friction pad, and press pad on which friction is made in the clutch.

BRIEF DESCRIPTION OF THE DRAWINGS

FIG. 6 is a horsepower-torque graph of the clutch wherein a conventional organic facing is provided with.

FIG. 7 is a horsepower-torque graph of the clutch wherein a conventional copper-ceramic facing is provided with.

FIG. 8 is a horsepower-torque graph of the clutch wherein a carbon-carbon composition facing according to the present invention is provided with.

DETAILED DESCRIPTION OF THE INVENTION

The clutch for transmission power according to the present invention includes a simplified spline hub and a clutch facing made of carbon-carbon composition having high performance in shock absorption capability. It can be simplified as a single part by the structure of a spline hub for improving assemblability and reducing weight, thereby improving transmission power efficiency of engine.

Moreover, the clutch facing made of carbon-carbon composition replaces the function of shock absorption, which was conventionally undertaken by coil spring or the like that was installed in a spline hub so that soft start can be attainable for automobiles. Furthermore, since fading is not generated due to its excellent properties of friction, abrasion and thermal shock resistance at high temperature, sufficient power can be transmitted, thereby enhancing its marketability and durability.

Hereinafter, preferred embodiments of the present invention will be described in detail with reference to the attached drawings.

Figure 1:
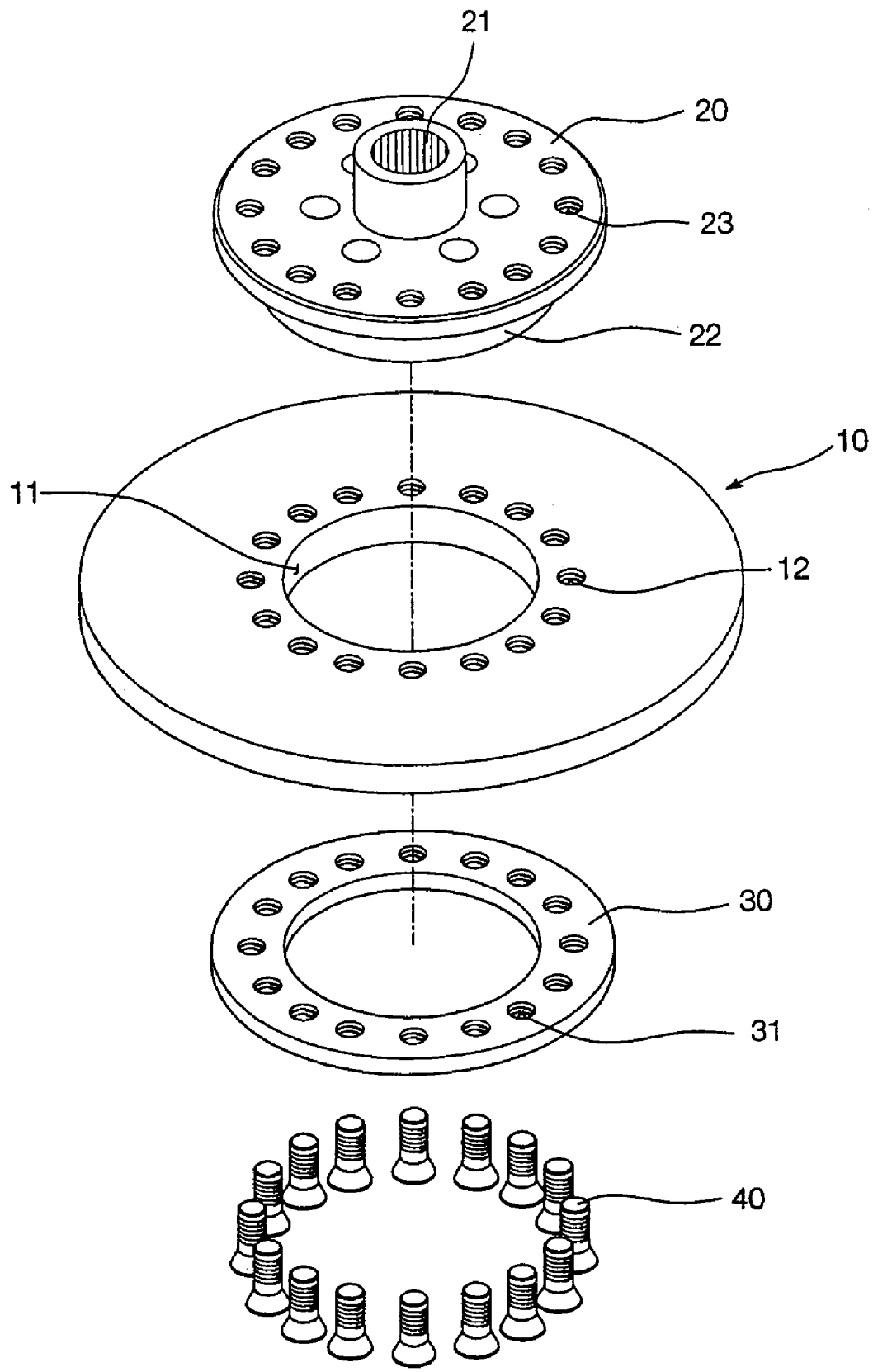
FIG. 1 is a perspective view showing a disassembled disk assembly of the clutch for transmission power according to the present invention.
Figure 2:
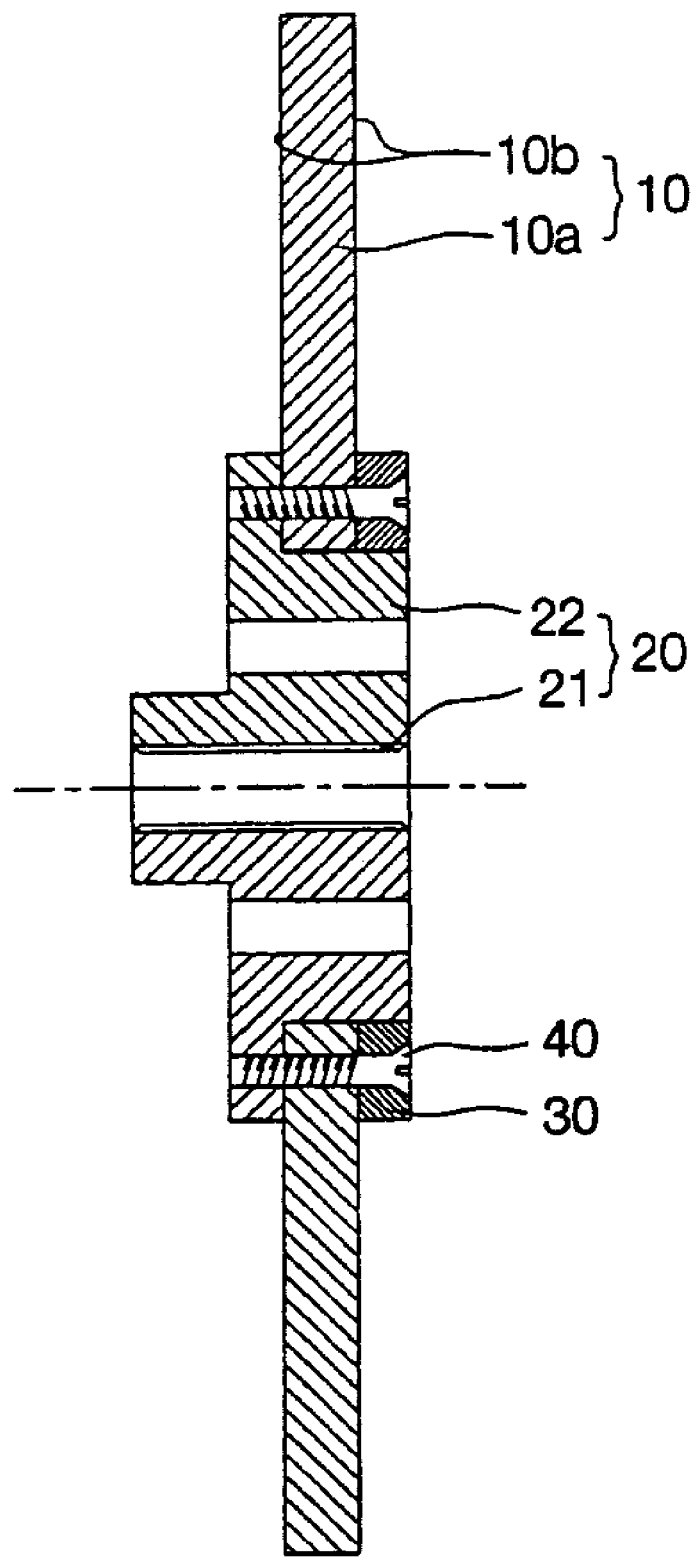
FIG. 2 is a cross sectional view showing an assembled disk assembly of the clutch for transmission power of FIG. 1.

The clutch disk assembly according to the present invention includes a clutch facing 10 made of carbon-carbon composition wherein a center hole 11 is formed in the middle thereof and a plurality of the first fastening holes along the outer circumference of the center hole 11 are formed as shown in FIG. 1 and FIG. 2.

The clutch facing 10 can be divided into a body portion 10a and a contacting portion 10b being integrated. The body portion 10a is a portion to be combined with a spline hub 20 to be described later, and the contacting portion 10b is a portion to be contacted with a friction pad 71 and a press pad 61 to be described later. Accordingly, body portion 10a and contacting portion 10b can be separately produced for combination and use, if required.

Furthermore, it has a spline hub 20 wherein a boss 22 being overlapped with one side of the clutch facing 10 and inserted into the center hole 11 is formed on one side, and a plurality of the second fastening holes 23 being communicated with a plurality of the first fastening holes 12 are formed along the circumference. Moreover, a plurality of spline grooves 21 are formed in the axial direction of the spline hub on the inner diameter of a bore which is formed in the middle of the spline hub 20.

Furthermore, a retainer ring 30 being overlapped with the first fastening holes 12 is formed on the other side of the clutch facing 10. A plurality of the third fastening holes 31 being communicated with the first fastening holes 12 are formed on this retainer ring 30.

Therefore, first fastening holes 12, second fastening holes 23 and third fastening holes 31 are communicated with one another for combining clutch facing 10, spline hub 20 and retainer ring 30 at the same time by a combining means. This combining means comprises a plurality of bolts 40 as shown in the drawing, and other types of combining means such as rivet or the like can be used if required. Each of fastening holes 12, 23 and 31 is formed with 10~20 in number.

On the other hand, the clutch facing 10 made of carbon composition is formed with carbon-carbon composition which is composed of 20~75 weight % of carbon fiber and 25~80 weight % of pitch, or with carbon-silicon carbide composition which is composed of 3~20 weight % of silicon, 10~60 weight % of silicon carbide, and 20~87 weight % of pitch-containing carbon. Moreover, the carbon fiber is formed with a single fiber or by stacking continuously woven carbon fabrics.

Figure 3:
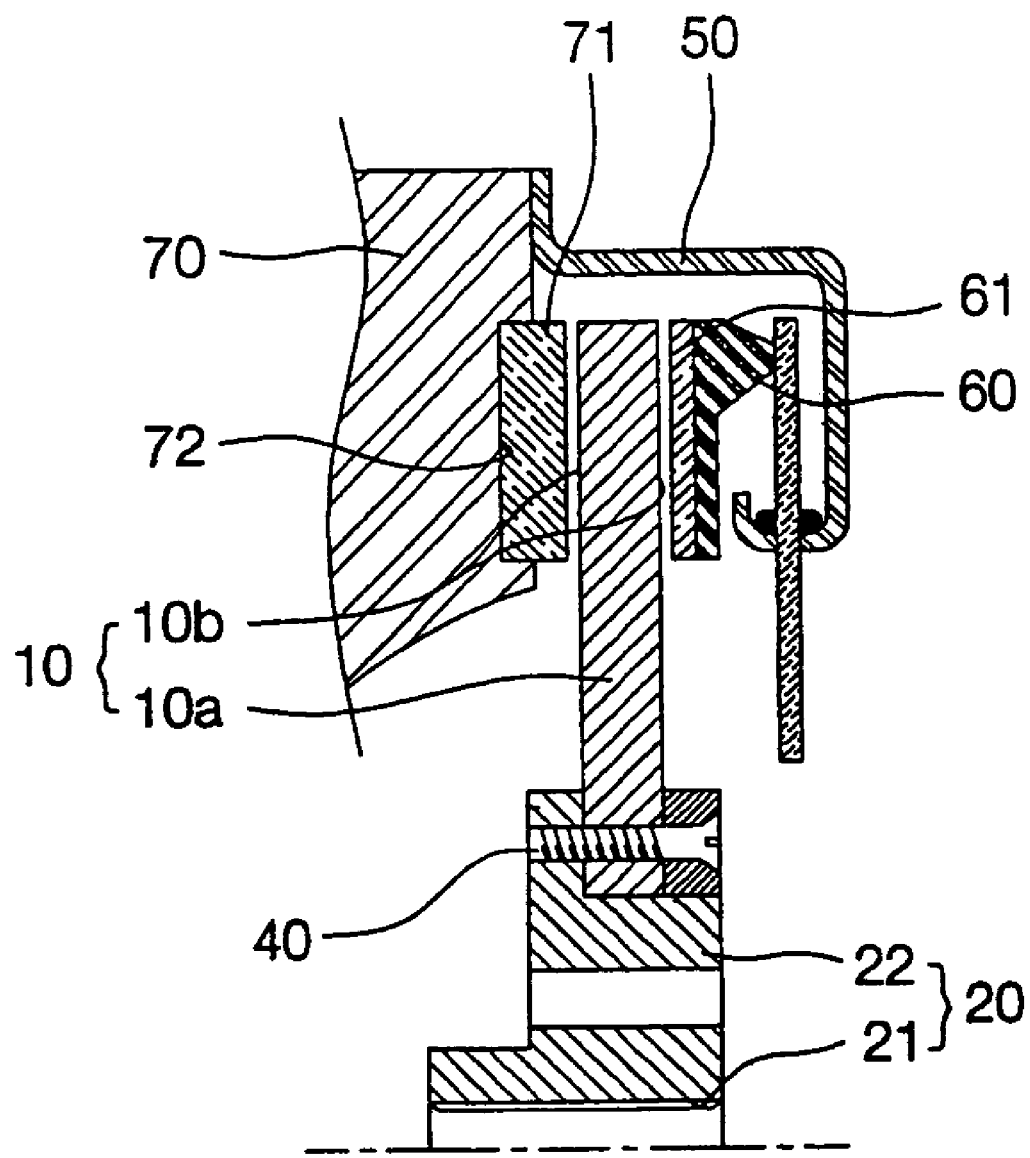
FIG. 3 is a cross sectional view showing a half of the clutch for transmission power which is installed with a disk assembly according to the present invention.

The clutch disk assembly according to the present invention is installed within clutch cover 50 as shown in FIG. 3. Furthermore, press plate 60 provided with press pad 61 is positioned on the right of the clutch facing 10 which is installed within clutch cover 50, and flywheel 70 provided with a friction pad 71 is positioned on the left.

Also, press pad 61 and friction pad 71 can be made of carbon composition. For installing friction pad 71 made of carbon composition, a groove 72 at the depth of 5~8 mm is formed on the surface of flywheel 70 on which each of them is provided, and adhesive agent is coated with a brush at the depth of 0.2~0.6 mm on this groove 72, and then the coated adhesive agent is dried within the range of 70~80° C. for 20~30 minutes.

Then, friction pad 71 is installed on each groove 72 by pressurizing with 350~1,000 KN/m$^2$ and holding it for curing within the range of 150~230° C. for 15~30 minutes, or it is fastened by bolts. This installation can also be used for press pad 61 made of carbon composition. In the present embodiment, it is illustrated that press pad 61 is attached to press plate 60 without providing a separate groove.

On the other hand, in another embodiment that is not shown in the drawing, it can be provided by installing a cushion plate on the spline hub, and bonding a clutch facing made of carbon composition to this cushion plate as used for conventional structure of a clutch disk. At this time, clutch facing is made of a master form or 3~6 pads, and the cushion plate of spline hub is also formed with a master form or by dividing into 3~6 pads in paddle type, and a clutch facing made of carbon composition is bonded with adhesive agent. Here, a separate cushion absorption structure is not required for the cushion plate as used for conventional clutches.

For a bonding method, moreover, bonding is performed by cleaning the cushion plate and clutch facing made of carbon composition with alcohol and drying at about 80° C. for 20 minutes, and then coating the cushion plate and carbon-carbon composition with adhesive agent at 0.2~0.6 mm wet thickness and drying within the range of 70~80° C. for 20~30 minutes, and then pressurizing at the press pressure of 350~1,000 KN/m$^2$, heating within the range of 150~230° C. and holding it for 5~30 minutes for curing.

Hereinafter, an embodiment for a method of manufacturing the friction substance for a clutch, which is used for a clutch facing, a friction pad, a press pad in clutches, will be described.

For the method of manufacturing the friction substance for a clutch according to the present invention, PAN (polyacrylonitrile)-based carbon fiber is used. The friction substance can be manufactured by the following processes, more particularly it can be manufactured by two-dimensional and three-dimensional forms.

Figure 4:
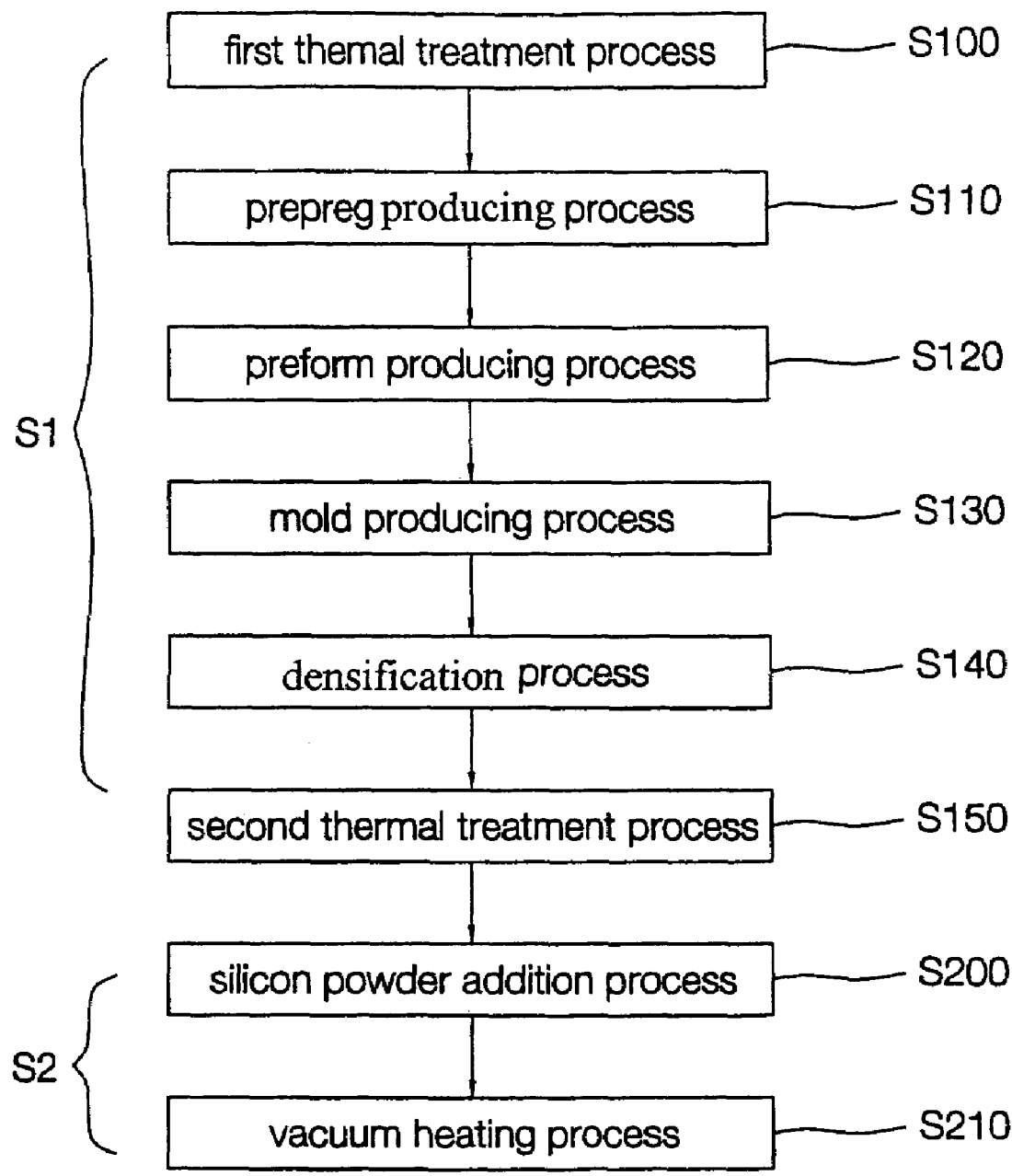
FIG. 4 is a flowchart showing a method of producing the friction substance for the clutch in a two-dimensional preform according to the present invention.

First, as shown in FIG. 4, the method of manufacturing a two-dimensional preform includes the steps of performing a first thermal treatment wherein carbon fiber is thermally treated for graphitization at a first thermal processing temperature (S100) for improving thermal conductivity, producing a prepreg wherein resin is sprayed on carbon fiber fabric for forming the prepreg (S110), producing a preform wherein carbon fiber and resin are stacked on the prepreg to form the preform (S120), producing a mold wherein the mold is formed by using a press on the preform (S130), and performing a second thermal treatment wherein the mold is thermally treated at a second thermal processing temperature (S150).

Furthermore, carbon-silicon carbide composition can be manufactured by performing a silicon powder addition process (S200) and a vacuum heating process (S210) additionally after performing the above-mentioned processes. Such divided processes will be described separately as the steps S1 and S2 in FIG. 4.

First, the first thermal treatment process S100 for manufacturing carbon-carbon composition as the step S1 is a graphitization process to improve the thermal conductivity of carbon fiber by performing a thermal treatment at high temperature on PAN-based carbon fiber at first thermal treatment temperature of 2,000~3,000° C. Moreover, the carbon fiber is formed with a single fiber or by stacking continuously woven carbon fabrics, and a cutting process for cutting the thermally treated carbon fiber at the length of 200~2,000 μm is performed using fiber cutting machine when carbon fiber is used for a single fiber.

In the prepreg producing process S110, a prepreg is produced by uniformly scattering resin such as pitch or resin which is crushed by a crusher at the fineness of 0.5~10 μm on the carbon fiber, and heating it within the range of 180~270° C.

In the preform producing process S120, a preform is produced by uniformly stacking the cut carbon fiber and the crushed resin on the prepreg.

In addition, a required mold is produced after heating the preform within the range of 200~300° C. during the mold producing process S130, and a densification process S140 for densifying the mold can be added separately after the mold producing process S130. In the densification process S140, a mold is densified at a predetermined density by pressurizing at the carbonizing pressure of 50~2,000 kg/cm$^2$ within the range of 750~1,400° C. for 3~5 hours, and performing a carbonization/impregnation process. Here, the predetermined density thereof is 1.3~1.6 g/cm$^3$.

Next, the second thermal treatment process S150 is performed at the maximum temperature for 3~5 hours under second thermal processing temperature of 1,700~2,500° C., vacuum level of 3~5 mmHg, and heat rising rate of 20~100° C./hr.

On the other hand, the step S2 for manufacturing carbon-silicon carbide composition by adding silicon powder to the surrounding of low density carbon-carbon composition which was produced using the above-mentioned method can be applied.

For this, silicon powder addition process S200 and vacuum heating process S210 can be applied additionally. Silicon powder 0.2~5.0 times heavier than the mold in weight ratio is added to the surrounding of the mold during silicon powder addition process S200, and carbon-silicon carbide composition is produced by increasing the temperature within the range of 1,450° C.~2,200° C. and maintaining it for 0.1~5.0 hours under the vacuum atmosphere during vacuum heating process S210.

The carbon-silicon carbide composition produced in this step is composed of 3~25 weight % of silicon, 10~65 weight % of silicon carbide, and 10~80 weight % of carbon.

Figure 5:
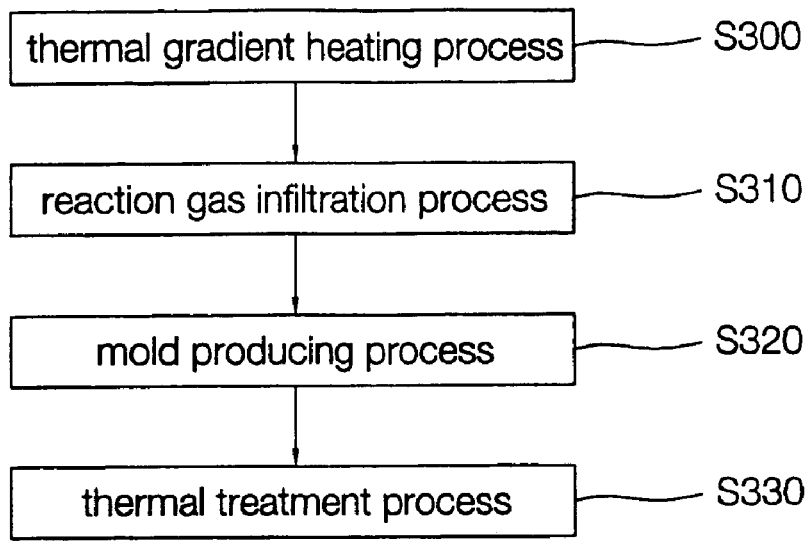
FIG. 5 is a flowchart showing a method of producing the friction substance for the clutch in a three-dimensional preform according to the present invention.

Next, as shown in FIG. 5, the manufacturing method by using a three-dimensional preform includes the steps of heating for creating thermal gradient between the inside and outside of the preform by mounting a heating element on the middle of the three-dimensional preform woven with carbon fiber (S300), infiltrating reaction gas, such as methane, ethane, propane, butane, pentane or hexane, containing 1~6 carbons per molecule inside the reactor (S310), producing a mold by performing reaction under a predetermined condition (S320), and performing a thermal treatment on the mold (S330).

Here, the three-dimensional preform is produced by weaving carbon rods having the diameter of 1~2 mm which have been prepared by a drawn molding process, and it is manufactured and marketed by companies such as ASNC (American Structure Needing Co.) in U.S.

Moreover, thermal gradient heating process S300 and reaction gas infiltration process S310 can be referred to as thermal gradient chemical vapor infiltration. As for the thermal gradient chemical vapor infiltration, it is performed on reaction material under the condition where in the thermal gradient is created between the inside and outside of the preform by providing a heating element in the middle of the carbon fiber preform that is mounted inside the reactor and heating by this heating element to create thermal conduction toward the outside from the middle of the preform.

According to this method of thermal gradient chemical vapor infiltration, density as well as thermal conductivity thereof increases in the middle of the preform by causing thermal decomposition of gas for vapor infiltration in the middle of the preform where the reaction temperature is arrived at relatively sooner. As a result, due to the thermal conductivity, infiltration is finally performed on the surface of the preform while the gas reaction area moves toward the surface by expanding the range of the reaction temperature gradually toward the surface from the middle.

Furthermore, mold producing process S320 is performed under heat rising rate of 10~20° C./min, reaction temperature of 700~1200° C., reaction gas concentration of 10~100%, and reaction pressure of 250~1,500 mbar; moreover, thermal treatment process S330 is performed at the maximum temperature for 3~5 hours under second thermal processing temperature of 1,700~2,500° C., vacuum level of 3~5 mmHg, and heat rising rate of 20~100° C./hr.

Hereinafter, the clutch facing formed with carbon composition according to the present invention and the clutch facing formed with conventional methods will be compared. In the following graphs, the results are shown by testing twice the clutches which are installed respectively with each type of clutch facing.

Figure 6:
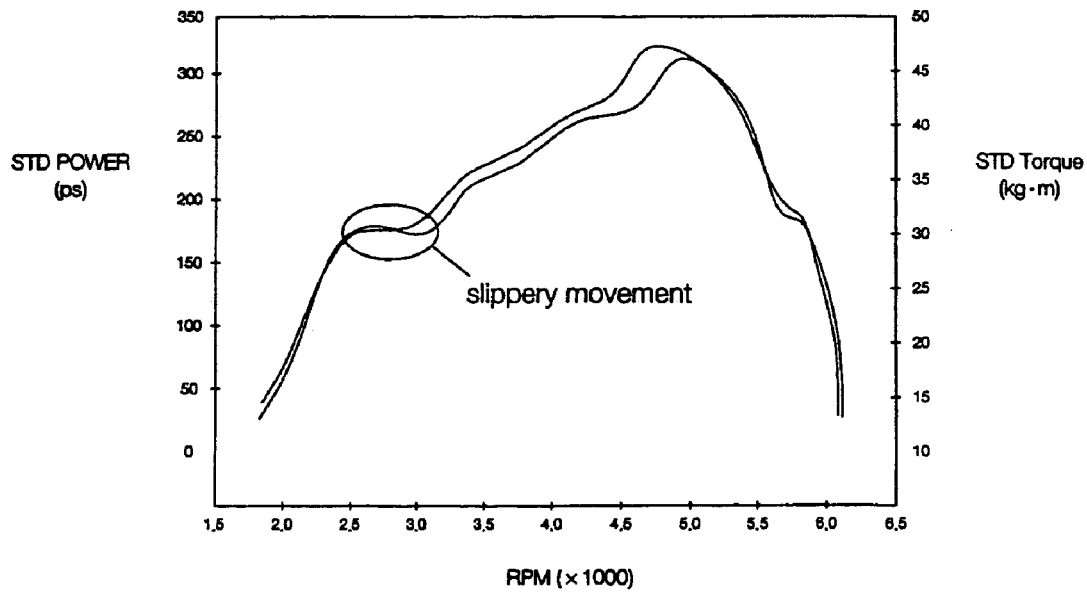

FIG. 6 is a graph showing the test result wherein the clutch installed with an organic-based facing is provided on chassis power testing machine. The horsepower (left side) and torque (right side) are plotted according to the RPM (axis of abscissa). As shown in the drawing, it is seen that this clutch is soft at the starting time but slippery movement occurs at abrupt acceleration or 2,800~3,800 RPM, thereby decreasing the efficiency of power transmission from the driving shaft flywheel to gear shaft by 20~30%.

Figure 7:
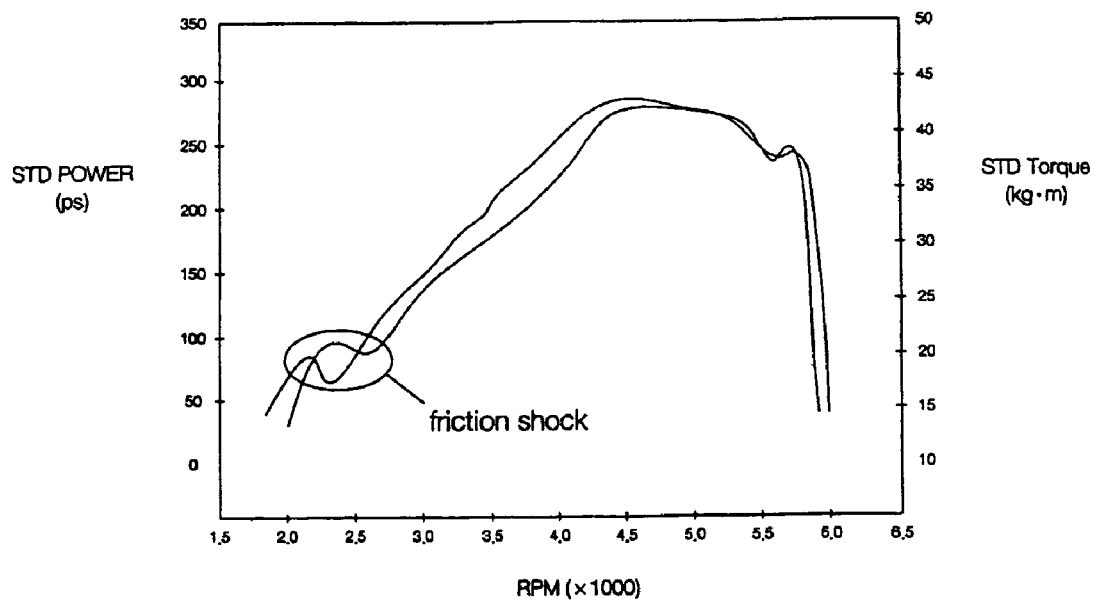

FIG. 7 is a horsepower-torque graph of the clutch wherein a conventional copper-ceramic sinter facing is provided with. The output response characteristic is good at abrupt acceleration, but it has a disadvantage that soft start can not be attainable for automobiles, so drivers feel tired easily due to abrupt friction shock that occurs at the starting time of 2,100~2,700 RPM.

Figure 8:
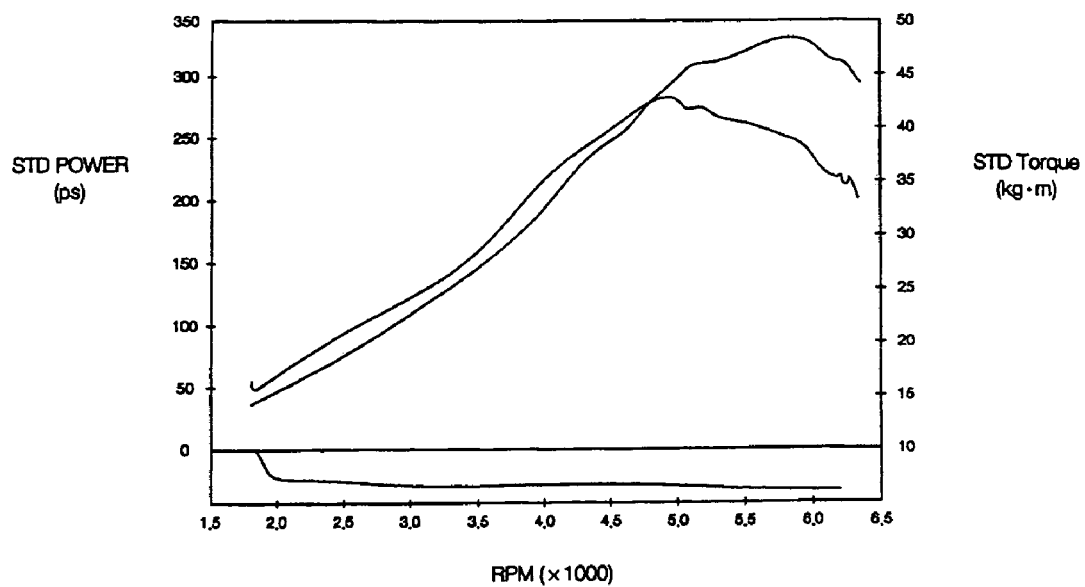

FIG. 8 is a graph showing the result wherein the clutch installed with a carbon composition clutch facing according to the present invention is tested for the maximum torque at 4,500~6,000 RPM, and it is seen that torque is 44.4 kg-M and horse power is 331.2 PS at 4,800 RPM. The automobile installed with a clutch having the clutch disk assembly according to the present invention can start softly; besides, it is seen that slippery does not occur at abrupt acceleration and power transmission from driving shaft flywheel to gear shaft is excellent. So it can be applied even at high torque values.

Figure 9:
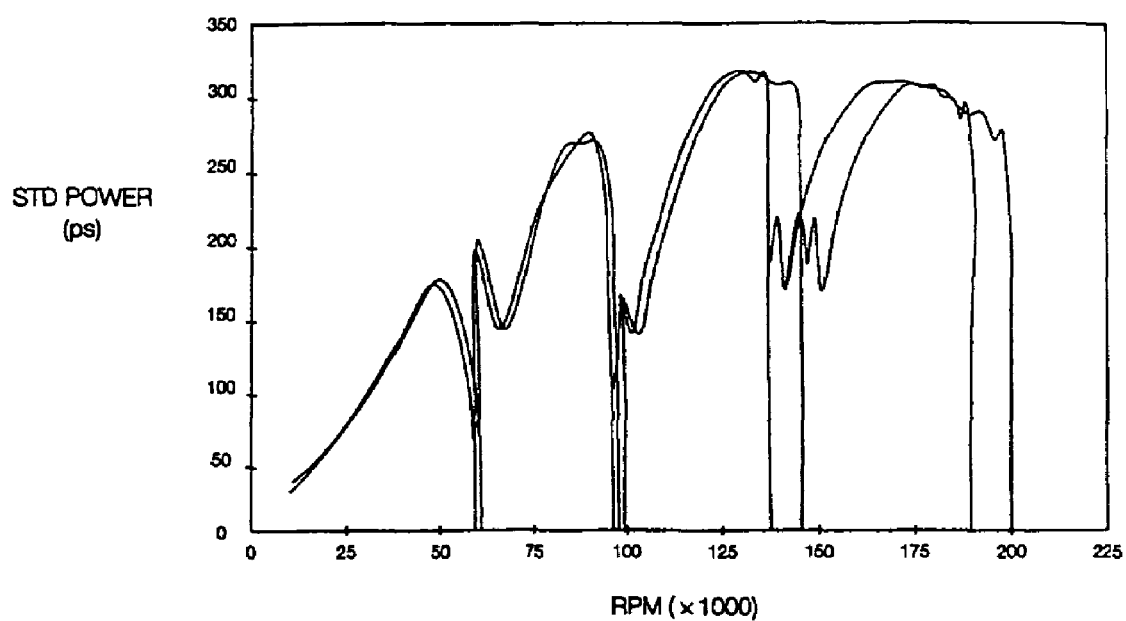
FIG. 9 is a graph showing the response characteristic of gear shift for the clutch installed with a clutch disk assembly according to the present invention.

FIG. 9 is a graph showing the response characteristic of gear shift for the clutch installed with a clutch disk assembly according to the present invention. It is seen that response characteristic is excellent since power transmission is soft without having loss or shock of power transmission as well as impact position while shifting to the second level from the first level at the starting time.

The characteristic of each clutch facing will be described in TABLE 1.

TABLE 1

| Characteristic | Clutch | | |
|---|---|---|---|
| | Organic-based | Copper-Ceramic Sinter | Carbon—Carbon Composition |
| Friction Coefficient | 0.10~0.30 | 0.25~0.40 | 0.25~0.45 |
| Max. Temperature (° C.) | 175~300 | 260~400 | 350~450 |
| Torque (kg-m) | 17~28 | 32~40 | 44.4 |
| Horse Power (Ps) | 200~300 | 270~300 | 331.2 |
| Press Plate Load (kgf) | 440~480 | 1000 | 1000 |

As shown in TABLE 1, friction coefficient shows similar tendency for both copper-ceramic sinter and carbon-carbon composition, and temperature shows higher for carbon-carbon composition when compared to the friction coefficient. Moreover, organic-based material was broken due to frictional heat and abrasion at the press plate load of 1000 kgf. In other words, it is seen that the carbon composition friction material used for clutch disk assembly shows a remarkably improved performance against organic-based material, and a slightly superior performance compared to copper-ceramic sinter material.

It should be understood that a person having ordinary skill in the art to which the invention pertains can modify some of the embodiments with regard to the clutch for transmission power and the method of manufacturing the friction substance for the clutch according to the present invention as mentioned above. However, if such modified embodiments include essential elements of the invention it should be regarded that they are all within technical scope of the invention; moreover, technical idea of the invention should not be restricted by the elements illustrated in the embodiments.

As described above, the clutch disk assembly and the method of manufacturing the friction substance for clutch according to the invention can improve assemblability and reduce weight by simplifying into a single part without using shock absorbing apparatus such as coil spring or the like on clutch disk assembly. In addition, the power transmission of an engine can be improved, and also it has an effect that an automobile can start softly and slippery does not occur even at abrupt acceleration by providing with carbon-carbon composition or carbon-silicon carbide composition having excellent shock absorption function.

What is claimed is:

1. A clutch for transmission power comprising a flywheel having a friction pad, a clutch cover having a press plate, and a clutch disk assembly positioned between said flywheel and said clutch cover, wherein said clutch disk assembly comprises:
a clutch facing having a main body portion formed with a center hole in the middle thereof, and a contacting portion wherein one side thereof faces the friction pad at said flywheel and the other side thereof faces the press plate of said clutch cover, and the contacting portion is made of a carbon-carbon composition which is composed of 20~75 weight % graphitized carbon fiber and 25~80 weight % pitch;

a spline hub being overlapped with one side of said clutch facing wherein a spline groove is formed in the inside thereof; and a combining means for combining said clutch facing with said spline hub.

2. The clutch for transmission power of claim 1, wherein said spline hub is formed with a boss for inserting into said center hole of said clutch facing.

3. The clutch for transmission power of claim 1, wherein said combining means comprises:

a retainer ring being overlapped with the other side of said clutch facing; and a fastening member for combining by passing through said clutch facing, said spline hub and said retainer ring together.

4. The clutch for transmission power of claim 3, wherein said fastening member includes either bolt or rivet.

5. The clutch for transmission power of claim 1, wherein said carbon fiber is a single fiber.

6. The clutch for transmission power of claim 1, wherein said carbon fiber is formed by stacking continuously woven carbon fabrics.

7. The clutch for transmission power of claim 1, wherein said contacting portion is formed with carbon-silicon carbide which is composed of 3~20 weight % silicon, 10~60 weight % silicon carbide, and 20~87 weight % pitch-containing carbon.

8. The clutch for transmission power of claim 7, wherein said carbon fiber is a single fiber.

9. The clutch for transmission power of claim 7, wherein said carbon fiber is formed by stacking continuously woven carbon fabrics.

10. The clutch for transmission power of claim 1, wherein said body portion is integrally formed with said contacting portion by using the same carbon-carbon composition material which is used for said contacting portion.

11. The clutch for transmission power of claim 1, wherein said press plate is provided with a press pad adjoining said clutch facing, and said press pad and said friction pad are formed with the same carbon-carbon composition which is used for said contacting portion.

* * * * *